United States Patent
Miyazawa

(10) Patent No.: US 12,179,658 B2
(45) Date of Patent: Dec. 31, 2024

(54) VEHICLE EXTERIOR DISPLAY DEVICE

(71) Applicant: Yazaki Corporation, Tokyo (JP)

(72) Inventor: Tomohiro Miyazawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/967,045

(22) Filed: Oct. 17, 2022

(65) Prior Publication Data

US 2023/0120392 A1    Apr. 20, 2023

(30) Foreign Application Priority Data

Oct. 18, 2021  (JP) ................................ 2021-169988

(51) Int. Cl.
*B60Q 1/26* (2006.01)
*B60Q 1/50* (2006.01)
*G06F 3/14* (2006.01)

(52) U.S. Cl.
CPC ........... *B60Q 1/5037* (2022.05); *B60Q 1/543* (2022.05); *G06F 3/14* (2013.01)

(58) Field of Classification Search
CPC .......... B60Q 1/5037; B60Q 1/543; G06F 3/14
See application file for complete search history.

(56) References Cited

U.S. PATENT DOCUMENTS

| | | | | |
|---|---|---|---|---|
| 6,459,387 B1 * | 10/2002 | Kobayashi | ............... | B60Q 1/18 362/465 |
| 6,735,519 B1 * | 5/2004 | Han | ....................... | G01C 21/26 340/988 |
| 10,037,699 B1 * | 7/2018 | Toyoda | .................. | G08G 1/166 |
| 10,043,395 B2 * | 8/2018 | Morel | ....................... | H04N 9/31 |
| 10,112,528 B1 * | 10/2018 | Mazuir | .................. | B60Q 5/006 |
| 10,118,537 B2 * | 11/2018 | Kunii | ................... | H04N 9/3194 |

(Continued)

FOREIGN PATENT DOCUMENTS

DE  10 2019 132 252 A1  6/2021
EP  2 993 083 A1  3/2016

(Continued)

OTHER PUBLICATIONS

Dow et al., A crosswalk pedestrian recognition system by using deep learning and zebra-crossing recognition techniques (Year: 2019).*

(Continued)

*Primary Examiner* — Quang Pham
(74) *Attorney, Agent, or Firm* — Sughrue Mion, PLLC

(57) ABSTRACT

A vehicle exterior display device includes: an own vehicle position information acquisition unit that acquires position information regarding an own vehicle; a crosswalk position information acquisition unit that acquires position information regarding a crosswalk; a surrounding information detection unit that detects a pedestrian existing around the own vehicle; a display unit that has a display region visually recognizable from the outside of the own vehicle and is capable of changing a relative position between the display region and the own vehicle; and a display controller that changes display information displayed by the display unit and changes the display region in which the display information is displayed, based on a positional relationship among the own vehicle, the crosswalk, and the pedestrian.

11 Claims, 9 Drawing Sheets

(56) References Cited

U.S. PATENT DOCUMENTS

| | | | |
|---|---|---|---|
| 10,118,548 B1* | 11/2018 | Fields | G08G 1/005 |
| 10,421,389 B2* | 9/2019 | Nagata | B60Q 1/28 |
| 10,497,178 B2* | 12/2019 | Cho | G06T 11/60 |
| 10,656,647 B2* | 5/2020 | Mangal | G05D 1/0088 |
| 10,665,106 B2* | 5/2020 | Choi | G05D 1/0214 |
| 10,688,915 B1* | 6/2020 | Rastoll | B60Q 1/28 |
| 10,706,719 B2* | 7/2020 | Zhang | G03B 29/00 |
| 10,814,840 B2* | 10/2020 | Kim | B60W 30/09 |
| 11,027,652 B2* | 6/2021 | Zafeirakis | B60R 1/12 |
| 11,117,549 B2* | 9/2021 | Turner | B60Q 5/005 |
| 11,228,675 B2* | 1/2022 | Park | G06F 3/04817 |
| 11,267,397 B2* | 3/2022 | Mimura | B60Q 1/543 |
| 11,270,589 B2* | 3/2022 | Shimizu | B60K 35/00 |
| 11,355,006 B1* | 6/2022 | Cho | G08G 1/096708 |
| 11,472,332 B1* | 10/2022 | Salter | B60Q 1/247 |
| 11,560,154 B1* | 1/2023 | Gate | G01C 21/3614 |
| 11,587,438 B2* | 2/2023 | Nishimura | G08G 1/052 |
| 11,798,406 B2* | 10/2023 | Camras | B60Q 1/24 |
| 12,049,219 B2* | 7/2024 | Benamar | B60W 30/09 |
| 12,083,957 B2* | 9/2024 | Shibata | B60Q 1/543 |
| 2004/0207519 A1* | 10/2004 | Tracy | B60Q 1/34 340/467 |
| 2007/0280503 A1* | 12/2007 | Kubota | B60Q 1/543 382/103 |
| 2008/0175012 A1* | 7/2008 | Shimaoka | B60Q 9/008 362/464 |
| 2008/0231435 A1* | 9/2008 | Lin | B60Q 1/48 340/435 |
| 2008/0243312 A1* | 10/2008 | Nakamura | G01C 21/26 701/1 |
| 2010/0156669 A1* | 6/2010 | Kim | G08G 1/08 340/917 |
| 2010/0277935 A1* | 11/2010 | Endo | B60Q 1/302 348/148 |
| 2011/0140919 A1* | 6/2011 | Hara | B60Q 1/507 340/907 |
| 2011/0260886 A1* | 10/2011 | Nagura | G08G 1/081 340/905 |
| 2012/0290146 A1* | 11/2012 | Dedes | G01C 21/165 701/1 |
| 2013/0144470 A1* | 6/2013 | Ricci | G06F 16/29 701/2 |
| 2014/0012864 A1* | 1/2014 | Nakagawa | G06F 16/24568 707/754 |
| 2014/0062685 A1* | 3/2014 | Tamatsu | G08G 1/005 340/425.5 |
| 2014/0266658 A1* | 9/2014 | Feldman | B60Q 5/005 340/438 |
| 2015/0035685 A1* | 2/2015 | Strickland | B60Q 9/008 340/901 |
| 2015/0065161 A1* | 3/2015 | Ganesh | H04W 4/027 455/456.1 |
| 2015/0194053 A1* | 7/2015 | Jensen | B60Q 1/442 340/944 |
| 2015/0228195 A1* | 8/2015 | Beaurepaire | B60Q 1/547 340/907 |
| 2015/0336502 A1* | 11/2015 | Hillis | G05D 1/0088 701/23 |
| 2016/0144785 A1* | 5/2016 | Shimizu | B60K 35/60 340/435 |
| 2016/0243945 A1* | 8/2016 | Zinner | B60L 15/2009 |
| 2017/0048678 A1* | 2/2017 | Hong | H04W 4/029 |
| 2017/0088035 A1* | 3/2017 | Williams | B60Q 1/0094 |
| 2017/0237945 A1* | 8/2017 | Murar | B60Q 1/247 348/148 |
| 2017/0246983 A1* | 8/2017 | Canonne | B60Q 1/085 |
| 2017/0267167 A1* | 9/2017 | Sakata | B60Q 1/247 |
| 2017/0303107 A1* | 10/2017 | Tanabe | H04W 4/90 |
| 2018/0004020 A1* | 1/2018 | Kunii | H04N 9/3179 |
| 2018/0056854 A1* | 3/2018 | Kunii | G01S 17/04 |
| 2018/0065545 A1* | 3/2018 | McMahon | E05F 15/73 |
| 2018/0079463 A1* | 3/2018 | Pearce | B62J 45/412 |
| 2018/0118099 A1* | 5/2018 | Kunii | B60Q 1/54 |
| 2018/0120686 A1* | 5/2018 | Hayashi | H04N 9/3167 |
| 2018/0141484 A1* | 5/2018 | Haneda | B60Q 1/525 |
| 2018/0173237 A1* | 6/2018 | Reiley | G05D 1/0061 |
| 2018/0174460 A1* | 6/2018 | Jung | G08G 1/166 |
| 2018/0218603 A1* | 8/2018 | Torii | G01C 21/365 |
| 2018/0257547 A1* | 9/2018 | Suzuki | B60Q 1/547 |
| 2018/0257549 A1* | 9/2018 | Suzuki | B60Q 1/04 |
| 2018/0260635 A1* | 9/2018 | Al-Dahle | G08G 1/09626 |
| 2018/0319325 A1* | 11/2018 | Tatara | B60Q 1/2696 |
| 2019/0005812 A1* | 1/2019 | Matus | G06V 20/584 |
| 2019/0016346 A1* | 1/2019 | Park | B60K 35/80 |
| 2019/0096256 A1* | 3/2019 | Rowell | G01S 15/931 |
| 2019/0106050 A1* | 4/2019 | Kamhi | B60Q 1/247 |
| 2019/0217863 A1* | 7/2019 | Jung | B60W 30/0956 |
| 2019/0236938 A1* | 8/2019 | Ekladyous | B60Q 1/547 |
| 2019/0248281 A1* | 8/2019 | Fushimi | B60Q 1/38 |
| 2019/0272749 A1* | 9/2019 | Saito | B60Q 1/268 |
| 2019/0366921 A1* | 12/2019 | Yoshida | G08G 1/166 |
| 2019/0366925 A1* | 12/2019 | Yoshihara | G08G 1/09626 |
| 2019/0367032 A1* | 12/2019 | Ito | B60W 50/00 |
| 2019/0369622 A1* | 12/2019 | Kim | B66B 25/003 |
| 2019/0389373 A1* | 12/2019 | Erdl | B60Q 1/535 |
| 2020/0058222 A1* | 2/2020 | Miyahara | B60Q 1/525 |
| 2020/0074847 A1* | 3/2020 | Wang | B60Q 1/547 |
| 2020/0086889 A1* | 3/2020 | Kaneko | G08G 1/166 |
| 2020/0108719 A1* | 4/2020 | Sumiyoshi | G09G 5/38 |
| 2020/0108826 A1* | 4/2020 | Kim | B60W 30/18159 |
| 2020/0122741 A1* | 4/2020 | Kuehnle | B60W 50/14 |
| 2020/0152052 A1* | 5/2020 | Baek | G08G 1/005 |
| 2020/0156533 A1* | 5/2020 | Lee | B60Q 1/507 |
| 2020/0226393 A1* | 7/2020 | Han | G06F 18/231 |
| 2020/0231085 A1* | 7/2020 | Kunii | B60Q 1/54 |
| 2020/0247434 A1* | 8/2020 | Kim | G08G 1/166 |
| 2020/0250553 A1* | 8/2020 | Tomaru | B60R 21/00 |
| 2020/0284872 A1* | 9/2020 | Fix | B60W 50/14 |
| 2020/0348136 A1* | 11/2020 | Jain | G01C 21/28 |
| 2020/0349836 A1* | 11/2020 | Shibata | G08G 1/0965 |
| 2020/0353948 A1* | 11/2020 | Kusayanagi | B60R 21/00 |
| 2020/0355511 A1* | 11/2020 | Shimizu | G01C 21/3461 |
| 2020/0361455 A1* | 11/2020 | Murakami | B60W 50/14 |
| 2021/0092573 A1* | 3/2021 | Shi | B60W 30/09 |
| 2021/0162917 A1* | 6/2021 | Morimura | B60Q 1/507 |
| 2021/0162995 A1* | 6/2021 | Shalev-Shwartz | B60W 40/107 |
| 2021/0197863 A1* | 7/2021 | Hotta | B60K 35/50 |
| 2021/0201673 A1* | 7/2021 | Nguyen | G08G 1/0145 |
| 2021/0214990 A1* | 7/2021 | Morosawa | E05B 81/78 |
| 2021/0217304 A1* | 7/2021 | Shino | G08G 1/123 |
| 2021/0239083 A1* | 8/2021 | Ekelund | B60K 35/22 |
| 2021/0261138 A1* | 8/2021 | Watanabe | B60W 40/09 |
| 2021/0287546 A1* | 9/2021 | Englander | G08G 1/166 |
| 2021/0347259 A1* | 11/2021 | Shibata | B60K 35/60 |
| 2021/0370964 A1* | 12/2021 | Uenoyama | B60W 50/14 |
| 2021/0394793 A1* | 12/2021 | Austin | G08G 1/0112 |
| 2022/0080879 A1* | 3/2022 | Moon | B60Q 1/547 |
| 2022/0084399 A1* | 3/2022 | Hehn | G08G 1/0125 |
| 2022/0097524 A1* | 3/2022 | Choi | B60Q 1/38 |
| 2022/0135079 A1* | 5/2022 | Ito | B60Q 1/507 701/23 |
| 2022/0219599 A1* | 7/2022 | Mochizuki | B60Q 1/507 |
| 2022/0270475 A1* | 8/2022 | Sakurada | G08G 1/04 |
| 2022/0283364 A1 | 9/2022 | Eichhorn et al. | |
| 2022/0319316 A1* | 10/2022 | Sakurada | G08G 1/005 |
| 2022/0397904 A1* | 12/2022 | Yamaguchi | B25J 13/081 |
| 2022/0402492 A1* | 12/2022 | Sakakura | G06V 20/584 |
| 2023/0035414 A1* | 2/2023 | Bergquist | B60W 60/00274 |
| 2023/0056501 A1* | 2/2023 | Yu | G06V 20/58 |
| 2023/0126901 A1* | 4/2023 | Lee | G08G 1/095 340/907 |
| 2023/0264689 A1* | 8/2023 | Hiramatsu | B60W 30/143 701/301 |
| 2024/0096208 A1* | 3/2024 | Mene | G08G 1/166 |
| 2024/0144814 A1* | 5/2024 | Ogata | G08G 1/081 |
| 2024/0246479 A1* | 7/2024 | Barrera | B60W 60/001 |

(56) References Cited

U.S. PATENT DOCUMENTS

2024/0246534 A1* 7/2024 Sugaya ............... B60W 40/105
2024/0246544 A1* 7/2024 Adams ................ G08G 1/0175

FOREIGN PATENT DOCUMENTS

| EP | 3 357 754 A1 | | 8/2018 |
| JP | 2019-215958 A | | 12/2019 |
| JP | 2021-20523 A | | 2/2021 |
| JP | 2021020523 A | * | 2/2021 |
| WO | 2017073634 A1 | | 5/2017 |

OTHER PUBLICATIONS

Fakhoury et al., Improving Pedestrian Safety Using Ultra-Wideband Sensors a Study of Time-to-Collision Estimation (Year: 2023).*
Figliozzi et al., Pedestrian Crosswalk Law a study of traffic and trajectory factors that affect non-compliance and stopping distance (Year: 2016).*

* cited by examiner

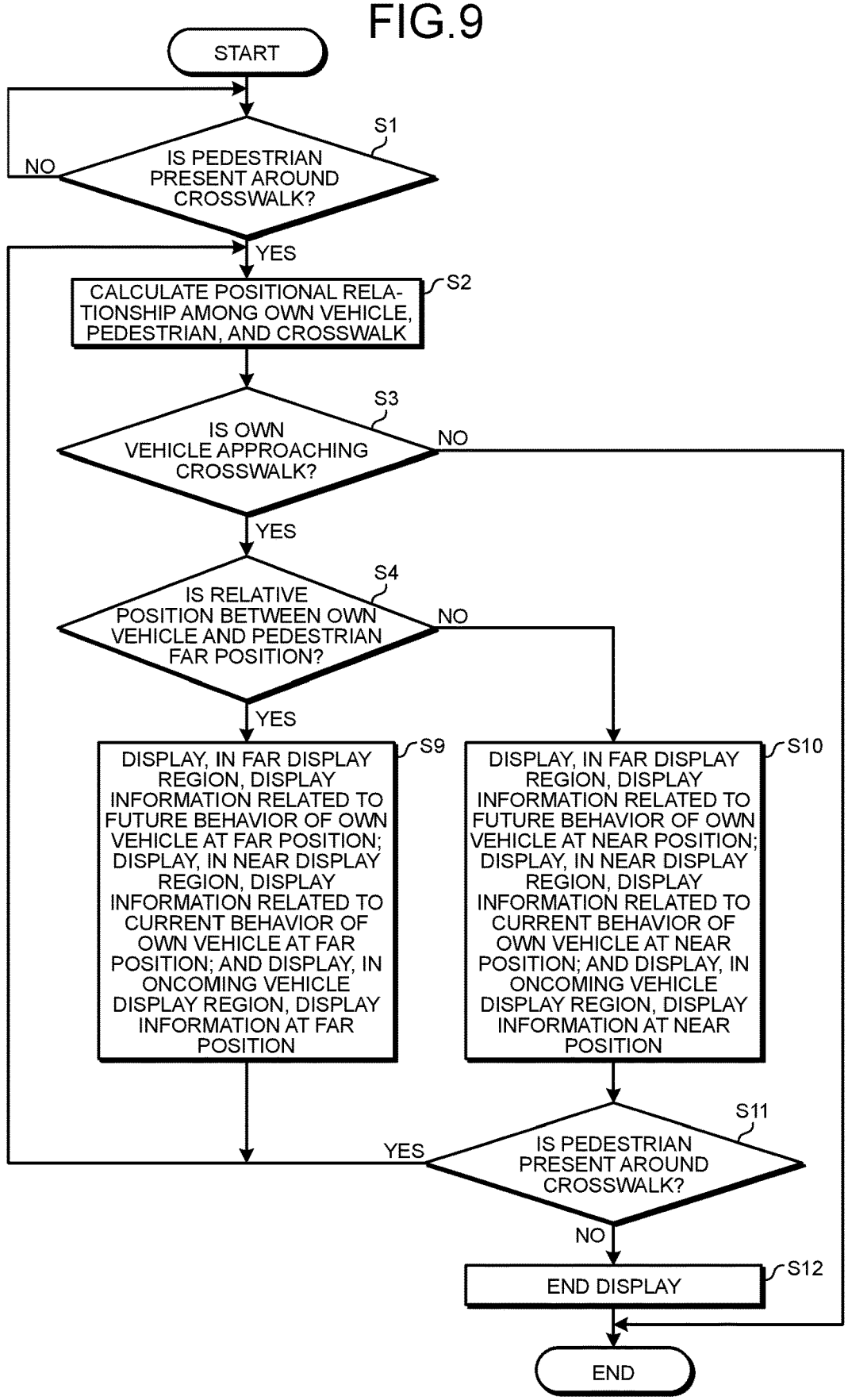

VEHICLE EXTERIOR DISPLAY DEVICE

CROSS-REFERENCE TO RELATED APPLICATION(S)

The present application claims priority to and incorporates by reference the entire contents of Japanese Patent Application No. 2021-169988 filed in Japan on Oct. 18, 2021.

BACKGROUND OF THE INVENTION

1. Field of the Invention

The present invention relates to a vehicle exterior display device.

2. Description of the Related Art

Conventionally, a pedestrian who needs to cross a roadway using a crosswalk can predict whether a vehicle stops in front of the crosswalk by making eye contact or the like with a driver when the driver is on the vehicle located in front of the crosswalk. However, along with the emergence of vehicles capable of automated driving, there are many situations in which a vehicle traveling by automated driving without a driver drives through a crosswalk. In this case, when a pedestrian who needs to cross a roadway using a crosswalk is located in front of the crosswalk and a vehicle approaching toward the crosswalk is driving in automated driving, it is difficult for the pedestrian to predict whether the vehicle will stop in front of the crosswalk. For example, International Publication WO 2017/073634 A discloses a technique in which an automated driving vehicle irradiates a road surface with a display of information indicating preliminary notification of stop to a pedestrian.

However, although the display of information indicating the preliminary notification of stop in International Publication WO 2017/073634 A is presented to a pedestrian around a crosswalk, the display can also be viewed by pedestrians other than the pedestrian around the crosswalk, and thus, there is a possibility that the pedestrian other than the pedestrian around the crosswalk erroneously perceives the message as a message to himself/herself.

SUMMARY OF THE INVENTION

The present invention has been made in view of the above, and aims to provide a vehicle exterior display device capable of performing display focused on a target of the message according to a positional relationship between a pedestrian and an own vehicle, and achieving transmission of useful information to the target.

In order to achieve the above mentioned object, a vehicle exterior display device according to one aspect of the present invention includes an own vehicle position information acquisition unit that acquires position information regarding an own vehicle; a crosswalk position information acquisition unit that acquires position information regarding a crosswalk; a surrounding information detection unit that detects a pedestrian around the own vehicle; a display unit that includes a plurality of display regions visually recognizable from outside of the own vehicle and is capable of displaying different types of display information visually recognizable by the display region; and a display controller that changes display information displayed by the display unit and the display region in which the display information is displayed, based on a positional relationship among the own vehicle, the crosswalk, and the pedestrian, wherein each of the plurality of display regions includes at least a far display region and a near display region, the display controller controls, out of the far display region and the near display region, the display region visible to the pedestrian existing around the crosswalk, to display display information related to behavior of a vehicle, and at least when a positional relationship between the vehicle and the pedestrian existing around the crosswalk is a far position, the display controller controls to perform display such that the display information displayed in the far display region and display information displayed in the near display region become different from each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart illustrating an example of control of the vehicle exterior display device according to the second embodiment.

DETAILED DESCRIPTION OF THE PREFERRED EMBODIMENTS

Hereinafter, exemplary embodiments of a vehicle exterior display device 1 according to the present invention will be described in detail with reference to the drawings. Note that the present invention is not limited by the embodiments.

First Embodiment

Figure 1:
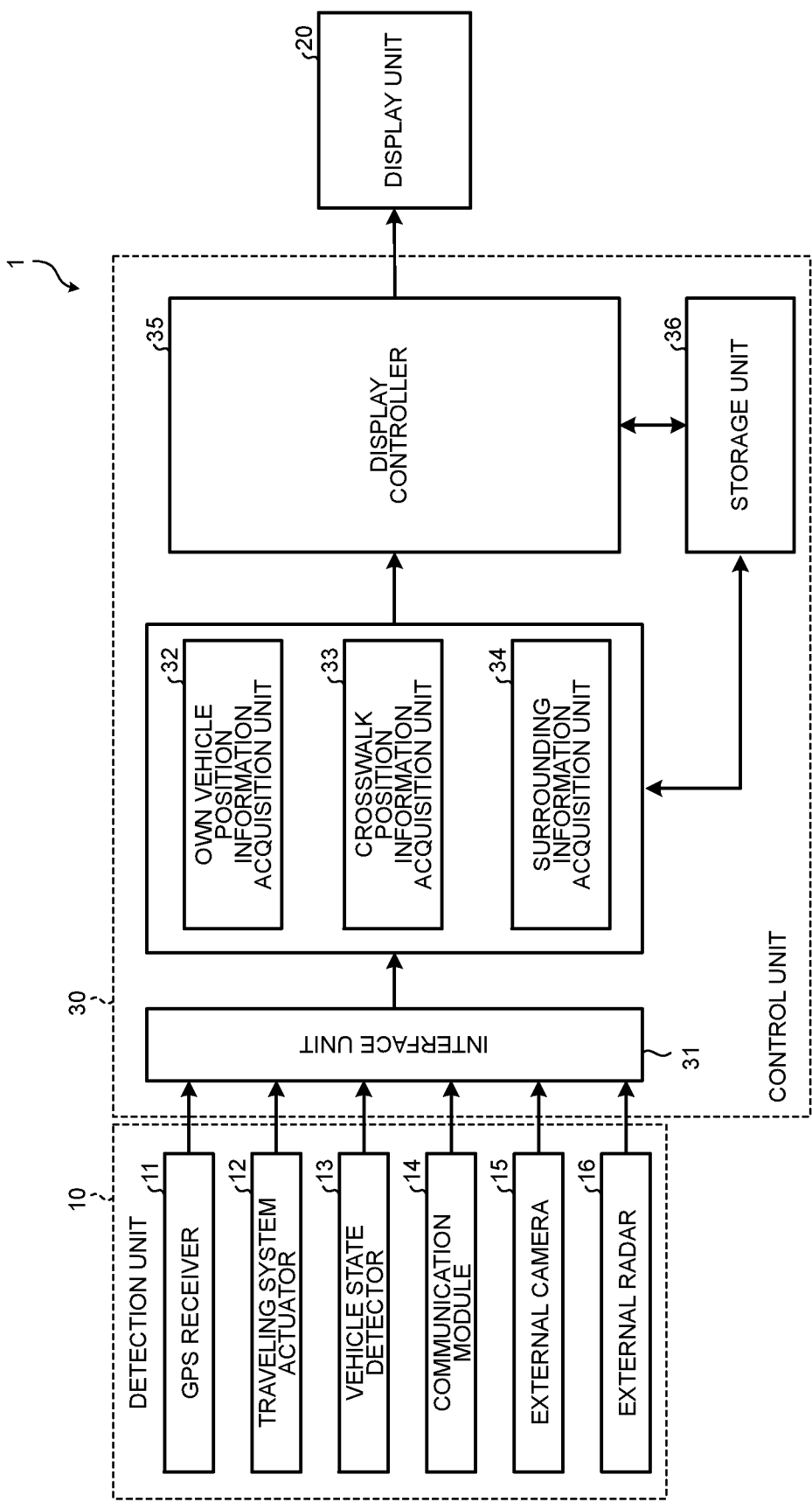
FIG. 1 is a block diagram illustrating a schematic configuration of a vehicle exterior display device according to a first embodiment.
Figure 2:
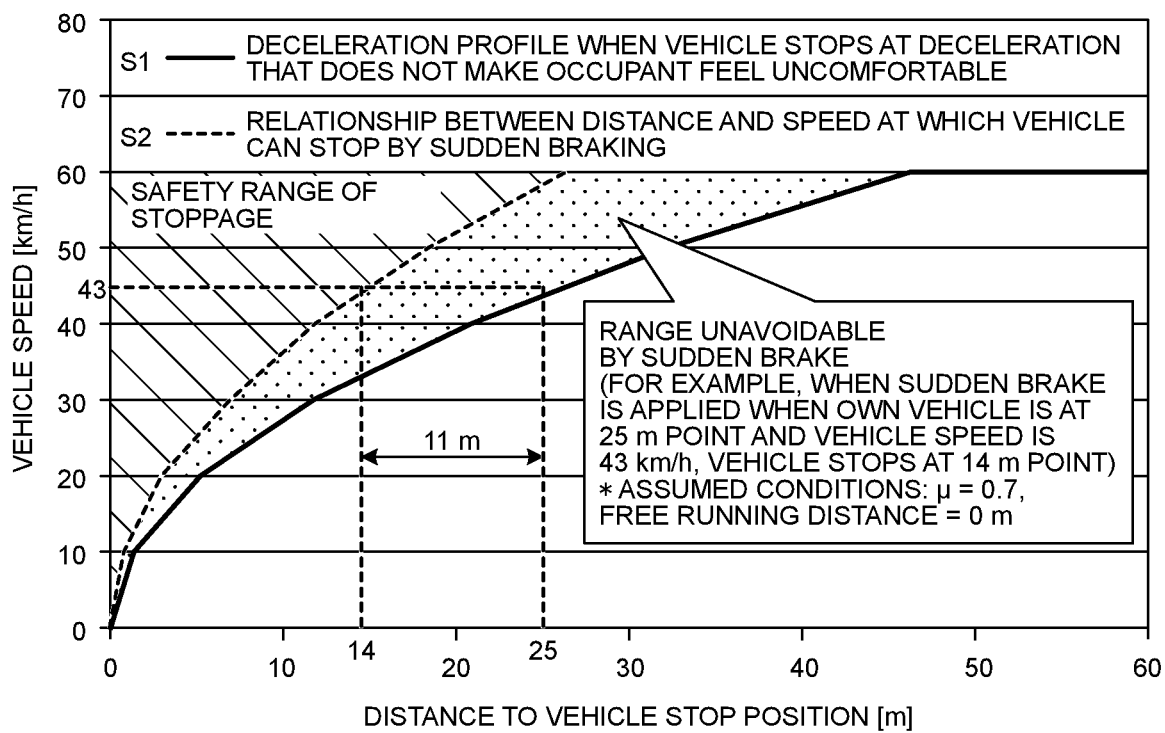
FIG. 2 is a diagram illustrating an example of a display region setting method used by the vehicle exterior display device according to the first embodiment.
Figure 3:
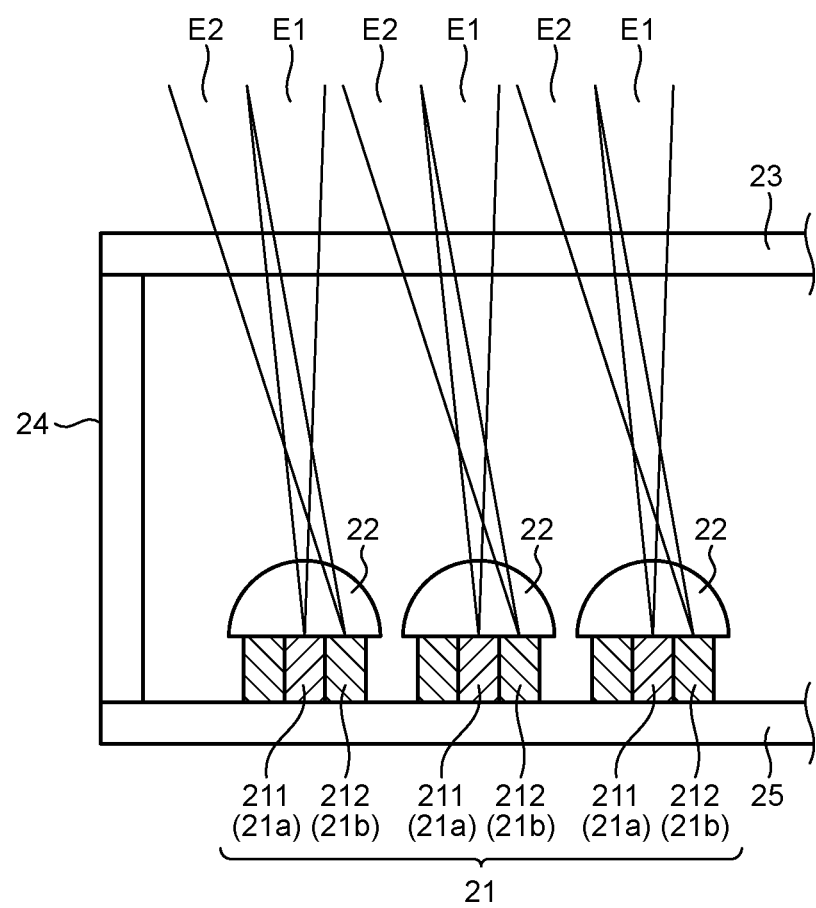
FIG. 3 is a diagram illustrating a configuration of a display unit according to the first embodiment.
Figure 4A:
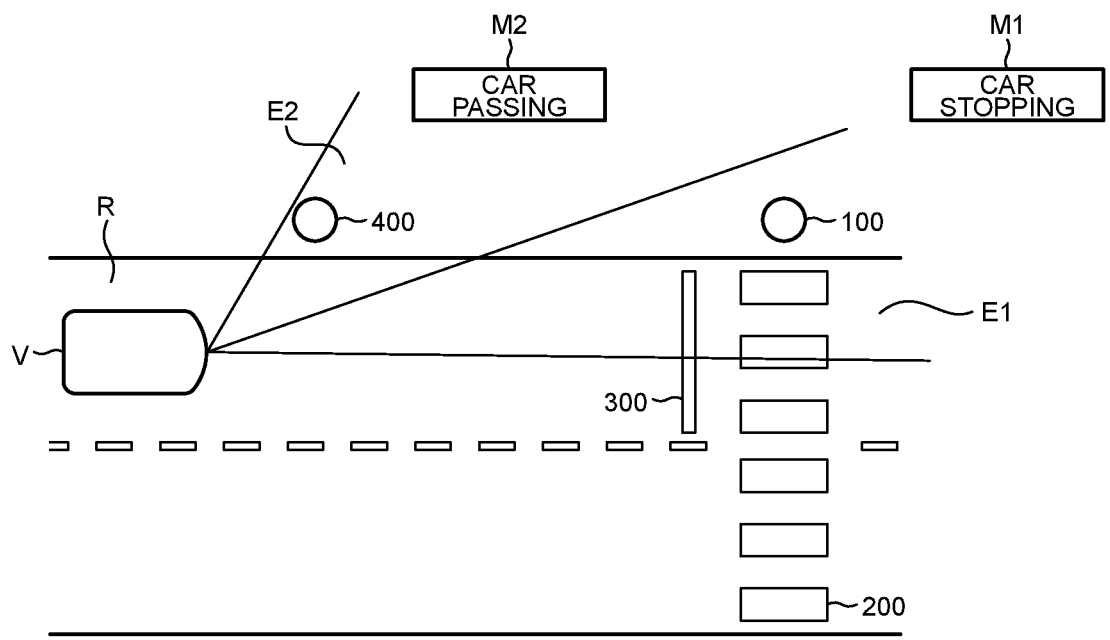
FIG. 4A is a diagram illustrating a display region and display information when a relative position between an own vehicle and a pedestrian around a crosswalk is a far position according to the first embodiment.
Figure 4B:
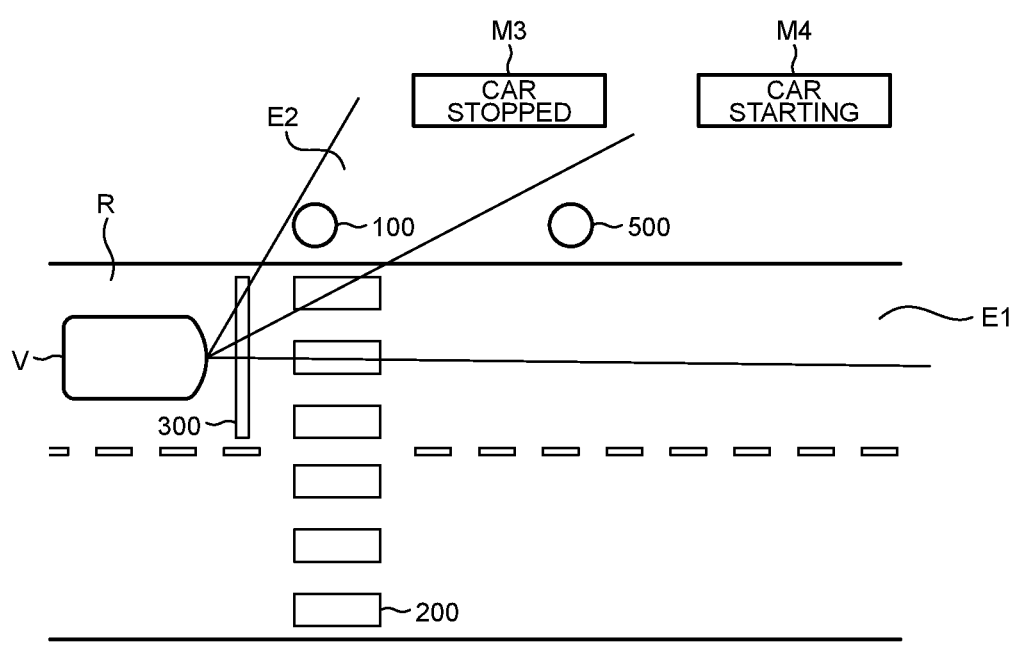
FIG. 4B is a diagram illustrating a display region and display information when a relative position between an own vehicle and a pedestrian around a crosswalk is a near position according to the first embodiment.

FIG. 1 is a diagram illustrating a vehicle exterior display device according to the present invention. FIG. 2 is a diagram illustrating an example of a display region setting method used by a vehicle exterior display device according to the first embodiment. FIG. 3 is a diagram illustrating a configuration of a display unit according to the first embodiment. FIG. 4A is a diagram illustrating a display region and display information when a relative position between an own vehicle and a pedestrian is a far position according to the first embodiment. FIG. 4B is a diagram illustrating a display region and display information when the relative position between the own vehicle and the pedestrian is a near position according to the first embodiment.

The vehicle exterior display device 1 is a display device that is applied to a vehicle V and performs various types of displays. The vehicle V to which the vehicle exterior display device 1 is applied may be any vehicle using a motor or an engine as a drive source, such as an electric vehicle (EV), a hybrid electric vehicle (HEV), a plug-in hybrid electric vehicle (PHEV), a gasoline vehicle, or a diesel vehicle. In addition, the driving of the vehicle V may be any of manual driving, semi-automated driving, fully automated driving, and the like, performed by the driver. Furthermore, the vehicle V may be any of a private car owned by an individual, a rental car, a sharing car, a bus, a taxi, and a ride sharing car.

In the following description, as an example, the vehicle V will be described as a vehicle capable of automated driving (including semi-automated driving and fully automated driving). The vehicle exterior display device 1 assumes implementation of driving referred to as automated driving by the vehicle V, and based on this assumption, implements appropriate display related to the behavior of the vehicle according to the positional relationship with persons outside the vehicle V. The vehicle exterior display device 1 is implemented by mounting the components illustrated in FIG. 1 on the vehicle V. Hereinafter, each configuration of the vehicle exterior display device 1 will be described in detail with reference to FIG. 1. In the following description, the vehicle V may be referred to as an "own vehicle V".

Note that, in the vehicle exterior display device 1 illustrated in FIG. 1, the connection method between individual components for supplying power, transmitting and receiving control signals, various types of information, and the like may be any of wired connection (including optical communication via an optical fiber, for example) via a wiring material such as an electric wire or an optical fiber, and wireless connection such as radio communication or contactless power feeding, unless otherwise specified.

Specifically, the vehicle exterior display device 1 includes a detection unit 10, a display unit 20, and a control unit 30.

First, the detection unit 10 will be described. The detection unit 10 is implemented by equipping the vehicle V with the components illustrated in FIG. 1. Specifically, the detection unit 10 includes a GPS receiver 11, a traveling system actuator 12, a vehicle state detector 13, a communication module 14, an external camera 15, and an external radar 16.

The GPS receiver 11 detects current position information indicating the current position of the vehicle V, that is, own vehicle position information X1, as surrounding status information. The GPS receiver 11 receives a radio wave transmitted from a GPS satellite to acquire GPS information (latitude and longitude coordinates) of the vehicle V as the own vehicle position information X1. The traveling system actuator 12 includes various devices needed for the vehicle V to travel. The traveling system actuator 12 typically includes a traveling powertrain, a steering device, a braking device, and the like. The traveling powertrain is a driving device that drives the vehicle V. The steering device is a device that steers the vehicle V. The braking device is a device that brakes the vehicle V. The vehicle state detector 13 detects vehicle state information including vehicle speed information, acceleration information, steering angle information, accelerator pedal operation amount information, brake pedal operation amount information, shift position information, current value/voltage value information, and charge amount information. The vehicle state detector 13 includes, for example, various detectors and sensors such as a vehicle speed sensor, an acceleration sensor, a steering angle sensor, an accelerator sensor, a brake sensor, a shift position sensor, and an ammeter/voltmeter. The vehicle state detector 13 may include an entire processing unit such as an electronic control unit (ECU) that controls individual components in the vehicle V. The communication module 14 transmits and receives information by radio communication to and from an external device of the vehicle V, such as another vehicle, an on-road device, a cloud device, or an electronic device possessed by a person outside the vehicle V. With this configuration, the communication module 14 detects surrounding status information including, for example, surrounding image information, external object information, traffic information, and the own vehicle position information X1. The communication module 14 communicates with an external device by various types of radio communication such as wide-range radio communication and narrow-range radio communication. Here, examples of the wide-range radio communication system include radio broadcasting (AM, FM), TV (UHF, 4K, 8K), telephone, GPS, and WiMAX (registered trademark). In addition, examples of the narrow-range radio communication system include ETC/DSRC, VICS (registered trademark), wireless LAN, and millimeter wave communication. The external camera 15 captures an image of the surroundings of the vehicle V constituting the surrounding image information and an image of a traveling road surface of the vehicle V constituting the white line information, as the surrounding status information. The external radar 16 detects, as the surrounding status information, external object information using infrared rays, millimeter waves, ultrasonic waves, or the like.

The display unit 20, provided on the vehicle V, has a plurality of display regions E, specifically two display regions E1 and E2 in the present embodiment, which can be visually recognized from the outside of the own vehicle V, and it is possible to display different display information M each of which is visually recognizable by the display regions E1 and E2. In the present embodiment, the display unit 20 is installed outside or inside the cabin in front of the vehicle V, and includes: a far display region E1 that is a region in which display is performed toward a far front of the vehicle V, particularly a far front left side in the case of left-hand traffic; and a near display region E2 that is a region adjacent to the far display region E1 and a region in which display is performed toward a near front of the vehicle V, particularly a near front left side in the case of left-hand traffic. Here, each of the display regions E1 and E2 is in a range in which the display of the display unit 20 is visible only by a specific pedestrian, having a display angle that can be displayed from the display unit 20. Each of the display regions E1 and E2 of the present embodiment changes display information M to be displayed according to the relative position between the own vehicle V and a pedestrian 100 around a crosswalk 200. For example, as illustrated in FIG. 2, a method of calculating the far display region E1 when assuming a vehicle traveling on a local road at a speed of 60 km/h will be described. A solid line S1 represents a deceleration profile when the vehicle V stops at a deceleration that does not make the occupant feel uncomfortable, and a dotted line S2 represents a relationship between a distance and a speed at which the vehicle V stops by sudden braking. Assuming a case where the vehicle V decelerates at a deceleration that does not make the occupant feel uncomfortable and the display is started on the display unit 20 at a position 25 meters in front of the vehicle stop position, the distance needed for the vehicle V to stop by sudden braking at the speed at a stop start time point is about 11 meters. When the traveling direction of the vehicle V is a forward direction, and a pedestrian present within 4 meters from the center cross section of the vehicle V in the left-right direction and present within 11 meters in front of the vehicle V rushes out, it would not be possible to avoid a collision. Therefore, it is desirable that the region is not visible to the pedestrian present in this range. In view of this, the far display region E1 is set based on Formula (1).

$$\Theta = \arctan(H/K) \times 180/\pi = \arctan(4/11) \times 180/\pi \approx 15.2 \quad (1)$$

($\Theta$: display angle (angle formed with forward direction of own vehicle V), H: road width, K: distance needed for the vehicle to stop by sudden braking)

The method of determining $\Theta$ is an example, and there is no restriction regarding the friction coefficient between the tire and the road surface, the assumed vehicle speed, deceleration, a deceleration start position, or the like. In addition, the determination may be made in consideration of parameters that affect a range in which the vehicle can be safely stopped, such as a road surface condition, weather, and accuracy of various sensors. Furthermore, the determination may be made in consideration of the influence of discomfort or the like on the occupant of the automated driving vehicle when the vehicle decelerates.

As illustrated in FIG. 3, the display unit 20 includes a light emitting unit 21, lenses 22, a cover 23, a case 24, and a substrate 25. The light emitting unit 21 in the present embodiment is to be mounted on the substrate 25 and arranged in plurality on a plane. The light emitting unit 21 in the present embodiment includes a plurality of light emitting unit groups 21a and 21b each corresponding to each of the lenses 22. The plurality of light emitting unit groups 21a and 21b specifically includes a first light emitting unit group 21a corresponding to the far display region E1 and a second light emitting unit group 21b corresponding to the near display region E2. The first light emitting unit group 21a includes a plurality of first light emitting units 211, and the second light emitting unit group 21b includes a plurality of second light emitting units 212. The first light emitting unit 211 is disposed corresponding to each lens 22, and is disposed at the center with respect to each lens 22 in the present embodiment. The second light emitting unit 212 is disposed corresponding to each lens 22, and is disposed in a state of being adjacent to the first light emitting unit 211, at one of both ends with respect to each lens 22 in the present embodiment. The first light emitting unit group 21a and the second light emitting unit group 21b are disposed alternately and emit light corresponding to the display information M related to the behavior of the own vehicle V. The display information M related to the behavior of own vehicle V is displayed as the display information M that changes according to display region E. Therefore, the first light emitting unit group 21a and the second light emitting unit group 21b emit light based on mutually different pieces of display information M. Specifically, when the relative position between the own vehicle V and the pedestrian 100 around the crosswalk 200 is a far position, the first light emitting unit group 21a corresponding to the far display region E1 emits light for displaying the display information M1 related to future vehicle behavior corresponding to the far position, while the second light emitting unit group 21b corresponding to the near display region E2 emits light for displaying display information M2 related to current vehicle behavior corresponding to the far position. However, in a case where the relative position between the own vehicle V and the pedestrian 100 around the crosswalk 200 is changed to the near position, information related to the behavior of the own vehicle V that the pedestrian 100 around the crosswalk 200 wants to know becomes different in the display information M from the case where the relative position between the own vehicle V and the pedestrian 100 around the crosswalk 200 is the far position. Accordingly, when the relative position between the own vehicle V and the pedestrian 100 around the crosswalk 200 is changed to the near position, the first light emitting unit group 21a corresponding to the far display region E1 emits light for displaying display information M4 related to future vehicle behavior corresponding to the near position, while the second light emitting unit group 21b corresponding to the near display region E2 emits light for displaying display information M3 related to current vehicle behavior corresponding to the near position. In this manner, the first light emitting unit group 21a and the second light emitting unit group 21b emit light based on mutually different pieces of display information M according to the positional relationship between the vehicle V and the pedestrian 100 around the crosswalk 200. The lens 22 has a semicircular cross section and transmits light from the light emitting unit 21. The lens 22 has different positions where light from the light emitting unit 21 is visually recognizable due to refraction of light according to an angle viewed from the outside of the vehicle V. The cover 23 has transparency and allows light from the light emitting unit 21 to be visually recognized from the outside of the vehicle V. The case 24 surrounds the light emitting unit 21 and the lens 22, and the cover 23 is fitted to the outside of the vehicle V of the case 24.

As illustrated in FIG. 1, the control unit 30 integrally controls individual components of the vehicle exterior display device 1. The control unit 30 may also be incorporated as an electronic control unit that integrally controls the entire vehicle V. The control unit 30 executes various types of arithmetic processing for implementation of traveling of the vehicle V. The control unit 30 includes an electronic circuit mainly including a known microcomputer, including a central processing device such as a central processing unit (CPU), a micro processing unit (MPU), an application specific integrated circuit (ASIC), and a field programmable gate array (FPGA), and including read only memory (ROM), random access memory (RAM), and an interface. The control unit 30 is electrically connected to the detection unit 10 and the display unit 20. The control unit 30 may be electrically connected with the detection unit 10 and the display unit 20 via an ECU (for example, a body ECU) that controls individual components of the vehicle V. The control unit 30 can exchange, with individual components, various electric signals such as various detection signals and a drive signal for driving the individual components.

Specifically, the control unit 30 functionally and conceptually includes an interface unit 31, an own vehicle position information acquisition unit 32, a crosswalk position information acquisition unit 33, a surrounding information acquisition unit 34, a display controller 35, and a storage unit 36. The interface unit 31, the own vehicle position information acquisition unit 32, the crosswalk position information acquisition unit 33, the surrounding information acquisition unit 34, the display controller 35, and the storage unit 36 can exchange various types of information with various types of electrically connected devices.

The interface unit 31 is an interface for transmitting and receiving various types of information to and from individual components such as a detection unit. Furthermore, the interface unit 31 is electrically connectable to the detection unit 10, the own vehicle position information acquisition unit 32, the crosswalk position information acquisition unit 33, and the surrounding information acquisition unit 34. The interface unit 31 has functions such as a function of performing wired communication of transferring information with individual components via an electric wire or the like and a function of performing wireless communication of information with individual components via a radio communication unit and the like.

The own vehicle position information acquisition unit 32 acquires the own vehicle position information X1. The own vehicle position information acquisition unit 32 acquires the own vehicle position information X1 based on information received by the GPS receiver 11, for example.

The crosswalk position information acquisition unit 33 acquires position information regarding the crosswalk 200. For example, the crosswalk position information acquisition unit 33 acquires crosswalk position information X2 that is position information regarding the crosswalk 200 existing in the traveling direction of the own vehicle V based on the own vehicle position information X1 and map information stored in advance in the storage unit 36. For example, the crosswalk position information acquisition unit 33 may acquire the crosswalk position information X2 based on a surrounding image of the own vehicle V captured by the external camera 15. Furthermore, the crosswalk position information acquisition unit 33 may acquire the crosswalk position information X2 based on the own vehicle position information X1 and map information stored outside the own vehicle V acquired by the communication module 14.

The surrounding information acquisition unit 34 acquires information around the own vehicle V. The surrounding information acquisition unit 34 in the present embodiment acquires information related to the pedestrian 100 being a viewer of the display unit 20 and existing around the own vehicle V. For example, the surrounding information acquisition unit 34 may acquire pedestrian position information X3 existing around the own vehicle V based on the surrounding image of the own vehicle V captured by the external camera 15. Furthermore, for example, the pedestrian position information X3 may be acquired based on surrounding objects of the own vehicle V scanned and detected by the external radar 16.

The display controller 35 controls the display information M regarding the behavior of the own vehicle V displayed on the display unit 20 in the far display region E1 and the near display region E2 of the display unit 20. The display controller 35 of the present embodiment changes the display information M related to the behavior of the own vehicle V in the display region E of the display unit 20 according to the relative position between the own vehicle V and the surrounding pedestrian 100 based on the positional relationship among the own vehicle position information X1 acquired by the own vehicle position information acquisition unit 32, the crosswalk position information X2 acquired by the crosswalk position information acquisition unit 33, and the pedestrian position information X3 acquired by the surrounding information acquisition unit 34. Specifically, the positional relationship between the crosswalk 200 and the pedestrian 100 is calculated based on the crosswalk position information X2 acquired by the crosswalk position information acquisition unit 33 and based on the pedestrian position information X3 acquired by the surrounding information acquisition unit 34, and determination is made whether the pedestrian 100 is located around the crosswalk 200, that is, whether the pedestrian 100 exists around the crosswalk 200. Regarding the determination that pedestrian 100 exits around the crosswalk 200, it is allowable to determine that the pedestrian 100 is about to cross the crosswalk 200 by determining that pedestrian 100 is located around the crosswalk 200, further determining whether the face or body direction of pedestrian 100 is directed toward the crosswalk 200, and determining that pedestrian 100 is directed toward the crosswalk 200. When it is determined that the pedestrian 100 is located around the crosswalk 200 and the pedestrian 100 is about to cross the crosswalk 200, the positional relationship between the pedestrian 100 and the own vehicle V around the crosswalk 200 is calculated based on the own vehicle position information X1 acquired by the own vehicle position information acquisition unit 32 and the pedestrian position information X3 acquired by the surrounding information acquisition unit 34. When it is determined that the relative position between the pedestrian 100 and the own vehicle V around the crosswalk 200 is the far position, the display information M1 regarding future behavior of the own vehicle according to the far position is displayed in the far display region E1 of the display unit 20 while the display information M2 regarding current behavior of the own vehicle according to the far position is displayed in the near display region E2. Furthermore, based on the own vehicle position information X1 acquired by the own vehicle position information acquisition unit 32 and the pedestrian position information X3 acquired by the surrounding information acquisition unit 34, the positional relationship between the pedestrian 100 around the crosswalk 200 and the own vehicle V is calculated. When it is determined that the relative position between the pedestrian 100 around the crosswalk 200 and the own vehicle V is the near position, the display information M3 related to the current behavior of the own vehicle according to the near position is displayed on the display unit 20 in the near display region E2 of the display unit 20, and the display information M4 related to the future behavior of the own vehicle according to the near position is displayed in the far display region E1.

For example, in a case where the vehicle V is traveling on a road R, and when the display controller 35 has determined that the relative position between the own vehicle V and the pedestrian 100 present around the crosswalk 200 is a far position based on the crosswalk position information X2 acquired by the crosswalk position information acquisition unit 33 and the pedestrian position information X3 acquired by the surrounding information acquisition unit 34 as illustrated in FIG. 4A, the display controller 35 performs display of the display information M1 such as "CAR STOPPING" related to the future behavior of the vehicle toward the pedestrian 100 present around the crosswalk 200, as the display information M displayed in the far display region E1 of the display unit 20. This enables the pedestrian 100 who is located around the crosswalk 200 and is about to cross the crosswalk 200 to visually recognize the display of the display unit 20. However, when another pedestrian 400 is present at a position closer to the vehicle V than the pedestrian 100 present around the crosswalk 200, the pedestrian 400 present at a position closer to the vehicle V than the pedestrian 100 present around the crosswalk 200 might erroneously perceive that the display is made for the pedestrian 400 oneself, even though the display is made for the pedestrian 100 present around the crosswalk 200. Therefore, the near display region E2 performs a display of display information M2 regarding the current behavior of the vehicle, such as "CAR PASSING" directed for the pedestrian 400 present at a position closer to the vehicle V than the pedestrian 100 present around the crosswalk 200, which is different from the display information M for the pedestrian 100 present around the crosswalk 200. At this time, the first light emitting unit group 21a emits light based on the display information M1 indicating "CAR STOPPING", while a second light emitting unit group 21b emits light based on the display information M2 indicating "CAR PASSING". As illustrated in FIG. 4B, when the vehicle V being an unmanned automated driving vehicle stops in front of the crosswalk 200, the relative position between the own vehicle V and the pedestrian 100 around the crosswalk 200 has changed to the near position as compared with FIG. 4A. Therefore, the display information M displayed in the near display region E2 of the display unit 20 is made by displaying the message "CAR STOPPED", which is display information M3 related to the current behavior of the vehicle toward the pedestrian 100 around the crosswalk 200. Since a pedestrian 500, who is farther away from the vehicle V than the pedestrian 100 present around the crosswalk 200, is concerned about the behavior taken by the automated driving vehicle, the display information M4 regarding the future behavior of the vehicle such as "CAR MOVING" is displayed in the far display region E1 visually recognizable by the pedestrian 500 present farther away from the vehicle V. At this time, the first light emitting unit group 21a emits light based on the display information M4 indicating "CAR MOVING", while the second light emitting unit group 21b emits light based on the display information M3 indicating "CAR STOPPED".

The storage unit 36 is a device that stores data related to the behavior of the own vehicle. The storage unit 36 may be, for example, a relatively large-capacity storage device such as a hard disk, a solid state drive (SSD), or an optical disk, or may be data rewritable semiconductor memory such as RAM, flash memory, or nonvolatile static random access memory (NVSRAM). The storage unit 36 stores conditions and information necessary for various processes in the control unit 30, various programs and applications executed by the control unit, control data, and the like. The storage unit 36 stores, for example, the display information M related to the behavior of the own vehicle V displayed on the display unit 20 controlled by the display controller 35. Storage unit 36 can also temporarily store various types of information acquired by the own vehicle position information acquisition unit 32, the crosswalk position information acquisition unit 33, and the surrounding information acquisition unit 34, for example. The information in the storage unit 36 is read by the display controller 35 as necessary.

Figure 5:
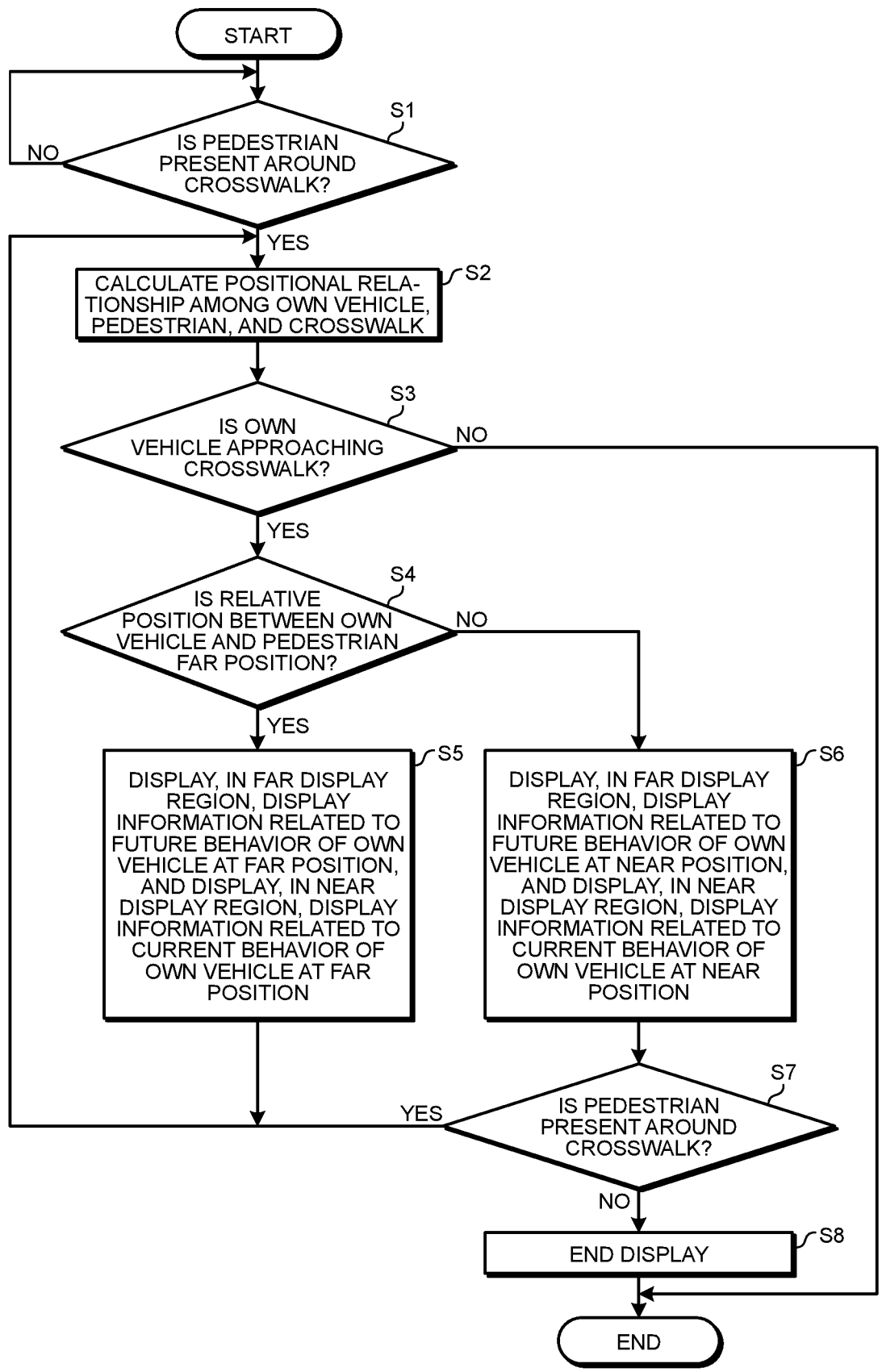
FIG. 5 is a flowchart illustrating an example of control of the vehicle exterior display device according to the first embodiment.

Next, an outline of an operation of the vehicle exterior display device 1 will be described. FIG. 5 is a flowchart illustrating an example of control of the vehicle exterior display device according to the first embodiment.

First, the display controller 35 determines whether the pedestrian 100 is present around the crosswalk 200 based on the pedestrian position information X3 and the crosswalk position information X2 (step S1). Specifically, a positional relationship between the crosswalk 200 and the pedestrian 100 is calculated based on the crosswalk position information X2 acquired by the crosswalk position information acquisition unit 33 and the pedestrian position information X3 acquired by the surrounding information acquisition unit 34, and a determination is made as to whether there is the pedestrian 100 who is about to cross the crosswalk 200. The display controller 35 determines that pedestrian 100 is about to cross the crosswalk 200 when the face or body of the pedestrian 100 is directed toward the crosswalk 200 or when the movement locus of the pedestrian 100 is directed toward the crosswalk 200.

When having determined that pedestrian 100 is not present around the crosswalk 200 (step S1: No), the display controller 35 repeats step S1 until the pedestrian 100 is present around the crosswalk 200.

When having determined that pedestrian 100 is present around the crosswalk 200 (step S1: Yes), the display controller 35 calculates the positional relationship among the own vehicle V, the crosswalk 200, and the pedestrian 100 based on the own vehicle position information X1, the crosswalk position information X2, and the pedestrian position information X3 (step S2).

Next, the display controller 35 determines whether the own vehicle V is approaching the crosswalk 200 based on the own vehicle position information X1 and the crosswalk position information X2 (step S3).

When having determined that the own vehicle V is approaching the crosswalk 200 (step S3: Yes), the display controller 35 determines whether the relative position between the own vehicle V and the pedestrian 100 is a far position based on the own vehicle position information X1 and the pedestrian position information X3 (step S4).

When having determined that the relative position between the own vehicle V and the pedestrian 100 is the far position (step S4: Yes), the display controller 35 displays the display information M1 related to the future behavior of the own vehicle at the far position in the far display region E1 and the display information M2 related to the current behavior of the own vehicle at the far position in the near display region E2 (step S5). For example, in order to enable the pedestrian 100 at the far position with respect to the own vehicle V to determine whether the own vehicle V recognizes the pedestrian 100, the display controller 35 causes the first light emitting unit group 21a corresponding to the near display region E2 to perform light emission for displaying the display information M1 related to the future behavior of the vehicle at the far position so as to achieve display of the display information M1 related to the future behavior of the own vehicle such as "CAR STOPPING". However, when the pedestrian 400 is present at a position closer to the own vehicle V than the pedestrian 100 present around the crosswalk 200, the pedestrian 400 present at a position closer to the own vehicle V than the pedestrian 100 present around the crosswalk 200 might erroneously perceive that the display is made for the pedestrian 400 oneself, even though the display is made for the pedestrian 100 present around the crosswalk 200. To handle this, the second light emitting unit group 21b corresponding to the near display region E2 is controlled to emit light for displaying the display information M2 related to the current behavior of the vehicle according to the far position, and display is performed in the near display region, toward the pedestrian 400 other than the pedestrian 100 present around the crosswalk 200, such as "CAR PASS- ING", as a different display from the information to be displayed for the pedestrian 100 present around the crosswalk 200 (refer to FIG. 4A).

Next, the display controller 35 calculates the positional relationship among the own vehicle V, the pedestrian 100, and the crosswalk 200 (step S2), determines that the own vehicle V is approaching the crosswalk 200 (step S3: Yes), and determines again whether the relative position between the own vehicle V and the pedestrian 100 is a far position (step S4). With this configuration, when the pedestrian 100 remains at the far position with respect to the own vehicle V, the display controller 35 maintains the display state of the display information M1 related to the future behavior of the own vehicle V at the far position in the far display region E1, and maintains the display state of the display information M2 related to the current behavior of the own vehicle V at the far position in the near display region E2.

When having determined that the relative position between own vehicle V and pedestrian 100 is not the far position, that is, the relative position is the near position (step S4: No), the display controller 35 causes the near display region E2 to display the display information M3 related to the current behavior of the own vehicle V at the near position and causes the far display region E1 to display the display information M4 related to the future behavior of the own vehicle at the near position (step S6). For example, in order to enable determination as to whether the pedestrian 100 located at a near position with respect to the own vehicle V can cross the crosswalk 200, the display controller 35 performs light emission for displaying the display information M3 related to the current behavior of the vehicle corresponding to the near position in the second light emitting unit group 21b corresponding to the near display region E2, so as to perform display of the display information M3 related to the current behavior of the own vehicle such as "CAR STOPPED". The pedestrian 500 who is away from the vehicle V is concerned about the behavior of the automated driving vehicle, and thus, light emission for displaying the display information M4 regarding the future behavior of the vehicle according to the near position is performed in the second light emitting unit group 21b corresponding to the far display region E1, so as to perform display of the display information M4 regarding the future behavior of the vehicle such as "CAR MOVING" in the far display region E1 visually recognizable from the pedestrian 500 who is away from the vehicle V (refer to FIG. 4B).

Next, the display controller 35 determines whether the pedestrian 100 is present around the crosswalk 200 based on the crosswalk position information X2 and the pedestrian position information X3 (step S7). Here, the display controller 35 determines whether the pedestrian 100 has crossed the crosswalk 200.

Next, when having determined that the pedestrian 100 is present around the crosswalk 200 (step S7: Yes), the display controller 35 calculates the positional relationship among the own vehicle V, the pedestrian 100, and the crosswalk 200 (step S2), determines that the own vehicle V is approaching the crosswalk 200 (step S3: Yes), and determines that the relative position between the own vehicle V and the pedestrian 100 is the near position (step S4: No). With this configuration, when the pedestrian 100 remains in the near position with respect to the own vehicle V, the display controller 35 maintains the display state, in the near display region E2, of the display information M3 related to the current behavior of the vehicle in the near position, and maintains the display state, in the far display region E1, of the display information M4 related to the future behavior of the own vehicle in the near position.

Next, when having determined that there is no pedestrian 100 around the crosswalk 200 (step S7: No), the display controller 35 ends the display being performed by the display unit 20 (step S8).

In the vehicle exterior display device 1 described above, even with the change in the relative position between the own vehicle V and the pedestrian 100, the pedestrian 100 around the crosswalk 200 can always visually recognize the display of the display unit 20, making it possible to visually recognize an appropriate message related to the behavior of the own vehicle V according to the relative position between the own vehicle V and the pedestrian 100. In addition, the pedestrians 400 and 500 other than the pedestrian 100 present around the crosswalk 200 visually recognize the display information M related to the behavior of the own vehicle V different from the information for the pedestrian 100 present around the crosswalk 200, making it possible to determine the behavior of the own vehicle V based on the display information M related to the behavior of the own vehicle V provided to the other pedestrians, namely, the pedestrians 400 and 500. With this configuration, the pedestrians 400 and 500 other than the pedestrian 100 around the crosswalk 200 are capable of acting based on the display information M regarding the behavior of the own vehicle V provided to themselves, making it possible to maintain the safety in the relationship with the own vehicle V. That is, the vehicle exterior display device 1 is capable of performing display focused on the target of the message in accordance with the positional relationship between the own vehicle V and the pedestrians 100, 400 and 500, achieving transmission of useful information to the target.

In addition, the vehicle exterior display device 1 controls the display that is performed by emission of the light emitting unit 21 in the display unit 20 according to whether the relative position between the own vehicle V and the pedestrian 100 around the crosswalk 200 is the far position or the near position, and changes the display information M of the display region E of the display unit 20 accordingly. This makes it possible for the vehicle exterior display device 1 to set a plurality of display regions E1 and E2 in one display unit 20.

In addition, by providing, in the vehicle exterior display device 1, the plurality of light emitting unit groups 21a and 21b corresponding to the far display region E1 and the near display region E2 respectively in accordance with the relative position between the own vehicle V and the pedestrian 100 present around the crosswalk 200, it is possible to visually recognize different displays depending on the angle when viewed from the outside of the vehicle.

Figure 6:
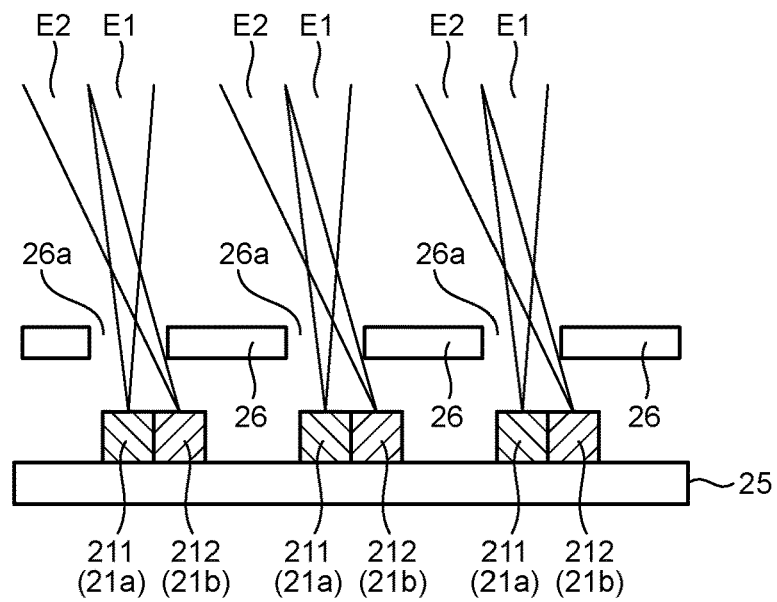
FIG. 6 is a diagram illustrating a display unit according to a modification.

Although the present embodiment has been described as a case of including the light emitting unit 21 and the lens 22, the configuration is not limited to this case. FIG. 6 is a diagram illustrating a display unit according to a modification. A light shielding member 26 is provided with a plurality of openings 26a each of which being formed corresponding to each of the light emitting units 21. The opening 26a is formed in such a size that would not allow a pedestrian to visually recognize light from a light emitting unit group adjacent to the corresponding light emitting unit group in the far display region E1 and the near display region E2. The light emitting unit 21 in the modification includes a plurality of light emitting unit groups each corresponding to the opening 26a. The plurality of light emitting unit groups has a configuration including: a first light emitting unit group 21a corresponding to the far display region E1; and a second light emitting unit group 21*b* corresponding to the near display region E2, in which the first light emitting unit group 21*a* and the second light emitting unit group 21*b* are alternately arranged. Specifically, the pedestrian located in the far display region E1 can visually recognize the light emission of the corresponding first light emitting unit group 21*a*, and thus can visually recognize the display of the display information M based on the light emission of the first light emitting unit group 21*a*, while the pedestrian located in the near display region E2 can visually recognize the light emission of the corresponding second light emitting unit group 21*b*, and thus can visually recognize the display of the display information M based on the light emission of the second light emitting unit group 21*b*.

The vehicle exterior display device 1 according to the modification has different types of light emitting unit groups visible from an opening 22*e* in accordance with the relative position between the own vehicle V and the pedestrian 100 around the crosswalk 200, so as to allow the display information corresponding to the relative position between the own vehicle and the pedestrian to be visually recognized.

The light shielding member 26 in the modification has been described as having the plurality of openings 26*a* corresponding to the light emitting units 21, but may be replaced with a transmissive liquid crystal panel.

Second Embodiment

Figure 7:
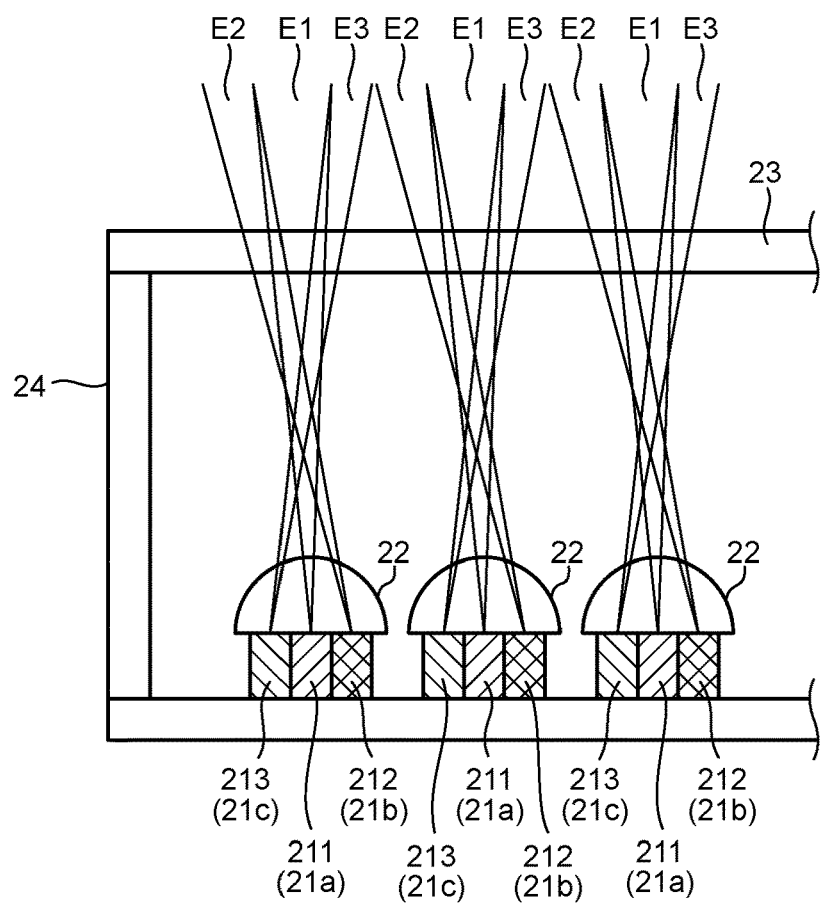
FIG. 7 is a diagram illustrating a configuration of a display unit according to a second embodiment.
Figure 8A:
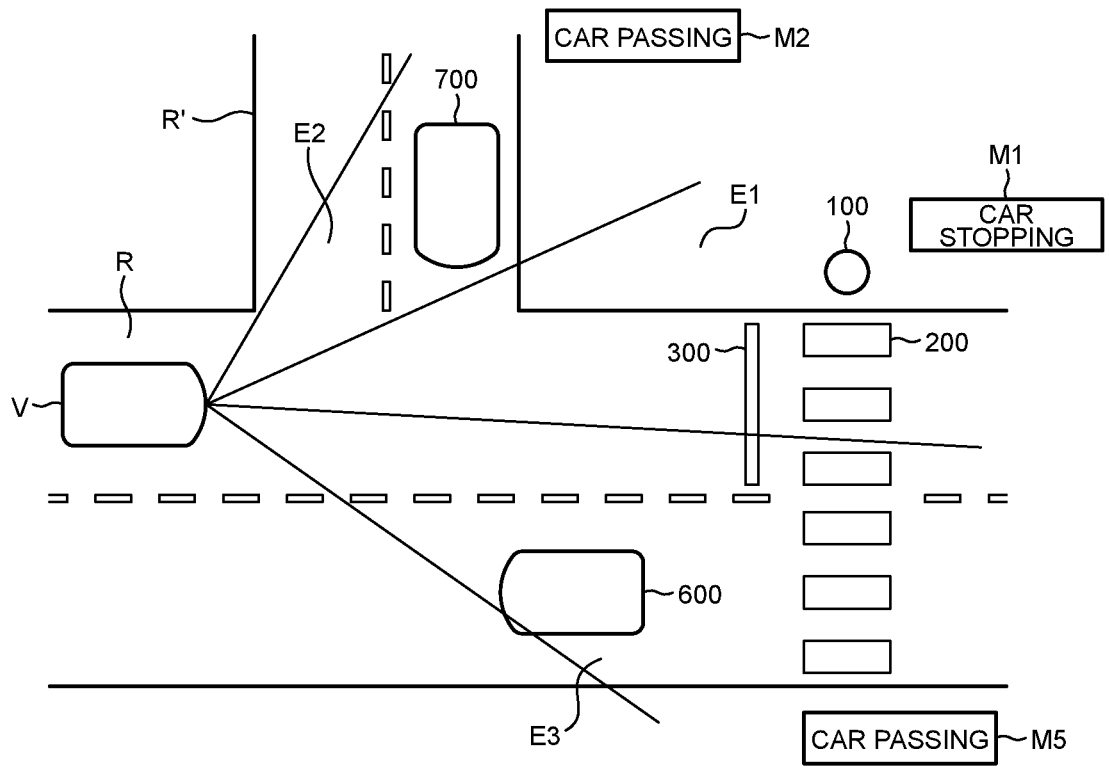
FIG. 8A is a diagram illustrating a display region and display information when a relative position between an own vehicle and a pedestrian around a crosswalk according to the second embodiment is a far position and there is an oncoming vehicle that needs to turn right.
Figure 8B:
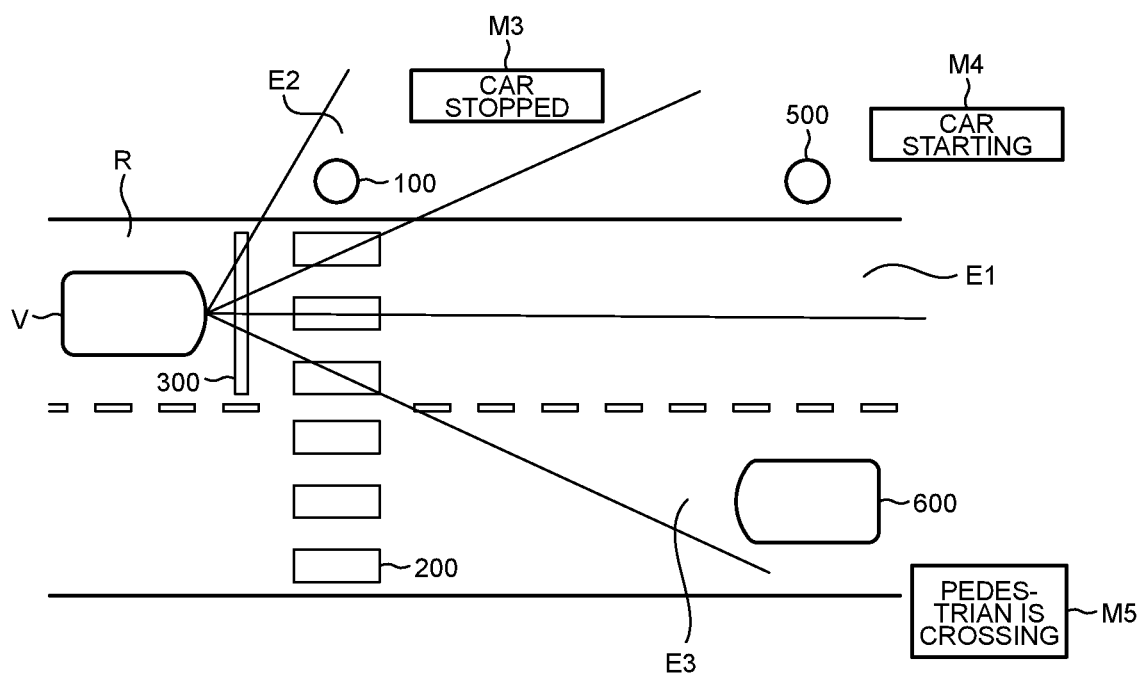
FIG. 8B is a diagram illustrating a display region and display information when a relative position between an own vehicle and a pedestrian around a crosswalk according to the second embodiment is a near position and there is an oncoming vehicle.
Figure 8C:
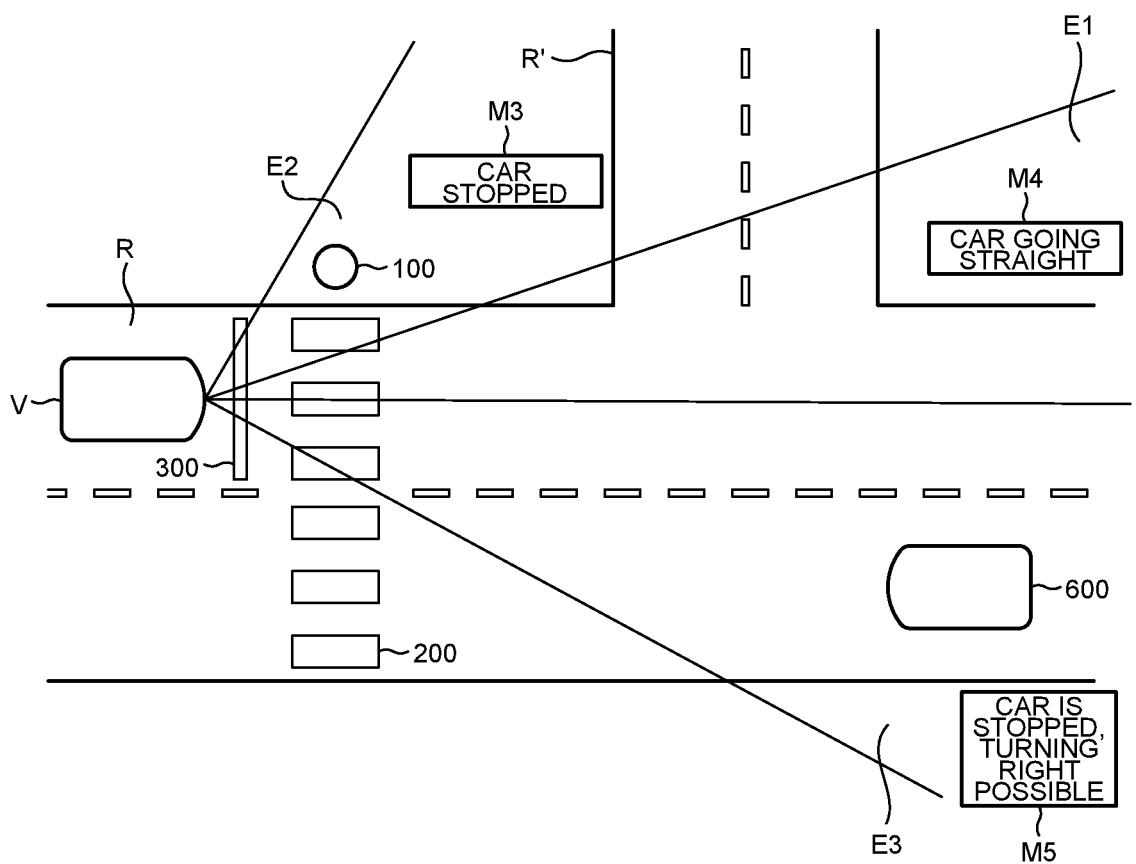
FIG. 8C is a diagram illustrating a display region and display information when a relative position between an own vehicle and a pedestrian around a crosswalk according to the second embodiment is a near position and there is an oncoming vehicle that needs to turn right.

Next, a vehicle exterior display device according to a second embodiment will be described. FIG. 7 is a diagram illustrating a configuration of the display unit 20 of the second embodiment. FIG. 8A is a diagram illustrating a display region and display information when a relative position between an own vehicle and a pedestrian around a crosswalk according to the second embodiment is a far position and there is an oncoming vehicle that needs to turn right. FIG. 8B is a diagram illustrating a display region and display information when a relative position between an own vehicle and a pedestrian around a crosswalk according to the second embodiment is a near position and there is an oncoming vehicle. FIG. 8C is a diagram illustrating a display region and display information when a relative position between an own vehicle and a pedestrian around a crosswalk according to the second embodiment is a near position and there is an oncoming vehicle that needs to turn right. The vehicle exterior display device 1 according to the second embodiment further includes an oncoming vehicle display region E3 added to the display region E of the vehicle exterior display device 1 according to the first embodiment. Since the basic configuration of the vehicle exterior display device 1 according to the second embodiment is entirely or substantially the same as the vehicle exterior display device 1 according to the first embodiment, differences will be described below.

The display region E of the display unit 20 includes a far display region E1, a near display region E2, and an oncoming vehicle display region E3. The display region E has a configuration in which the far display region E1 is disposed between the near display region E2 and the oncoming vehicle display region E3. The light emitting unit 21 includes a plurality of light emitting unit groups 21*a*, 21*b*, and 21*c* corresponding to the lens 22 individually. The plurality of light emitting unit groups 21*a*, 21*b*, and 21*c* are the first light emitting unit group 21*a* corresponding to the far display region E1, the second light emitting unit group 21*b* corresponding to the near display region E2, and the third light emitting unit group 21*c* corresponding to the oncoming vehicle display region E3, respectively, in which the third light emitting unit group 21*c* includes a plurality of third light emitting units 213. The third light emitting unit 213 is disposed corresponding to each lens 22, and is disposed in a state of being adjacent to the first light emitting unit 211, at the other end out of both ends with respect to each lens 22, in the present embodiment. The third light emitting unit group 21*c* performs light emission corresponding to the display information M related to the behavior of the own vehicle V different from or the same as the display information M of the first light emitting unit group 21*a* and the second light emitting unit group 21*b*. The oncoming vehicle display region E3 is a display region that performs display different from the display related to the behavior of the vehicle visually recognizable by the pedestrian 100 around the crosswalk 200. Specifically, as illustrated in FIG. 8A, when the relative position between the own vehicle V and the pedestrian 100 around the crosswalk 200 is the far position, and when there is an oncoming vehicle 600 that needs to turn to a road R' connected to a road R on which the own vehicle V travels, that is, needs to turn right, the far display region E1 displays the display information M1 related to the future behavior of the vehicle directed toward the pedestrian 100 around the crosswalk 200, such as "CAR STOPPING". In addition, the near display region E2 is a display region that displays the display information M2 regarding the behavior of the current vehicle, such as "CAR PASSING", which is directed for a merging waiting vehicle 700 that needs to merge into the road R from the road R' and is at a position closer to the vehicle V than the position of the pedestrian 100 around the crosswalk 200 and which is different from the display information M1 for the pedestrian 100 around the crosswalk 200. On the other hand, when there is the oncoming vehicle 600 that needs to turn right, the driver riding on the oncoming vehicle 600 might erroneously perceive that the display is made for the oncoming vehicle 600 although the display is actually made for the pedestrian 100 present around the crosswalk 200. To handle this, the oncoming vehicle display region E3 displays display information M5 including a display such as "CAR PASSING", which is different from the display related to the behavior of the vehicle visually recognizable by the pedestrian 100 around the crosswalk 200. At this time, the first light emitting unit group 21*a* emits light based on the display information M1 indicating "CAR STOPPING", the second light emitting unit group 21*b* emits light based on the display information M2 indicating "CAR PASSING", and the third light emitting unit group 21*c* corresponding to the oncoming vehicle display region E3 emits light based on the display information M5 indicating "CAR PASSING". As illustrated in FIG. 8B, when the relative position between the own vehicle V and the pedestrian 100 around the crosswalk 200 is the near position, and when there is the oncoming vehicle 600 that need to turn right, the near display region E2 displays the display information M3 such as "CAR STOPPED" related to the current behavior of the vehicle directed toward the pedestrian 100 around the crosswalk 200. In addition, the display information M4 related to future vehicle behavior such as "CAR STARTING" is displayed for the pedestrian 500 who is farther away from the vehicle V than the pedestrian 100 around the crosswalk 200. Moreover, the oncoming vehicle display region E3 displays display information M4 such as "PEDESTRIAN IS CROSSING", which is different from the display information M3 related to the behavior of the vehicle visually recognizable by the pedestrian 100 around the crosswalk 200. At this time, the first light emitting unit group 21a emits light based on the display information M4 indicating "CAR STARTING", the second light emitting unit group 21b emits light based on the display information M3 indicating "CAR STOPPED", and the third light emitting unit group 21c corresponding to the oncoming vehicle display region E3 emits light based on the display information M5 indicating "PEDESTRIAN IS CROSSING". With this configuration, the oncoming vehicle 600 notices the existence of the pedestrian 100 crossing the crosswalk 200 and can stop in front of the crosswalk 200. In addition, as illustrated in FIG. 8C, when the relative position between the own vehicle V and the pedestrian 100 around the crosswalk 200 is the near position, and when there is the oncoming vehicle 600 that needs to turn to the road R' connected to the road R on which the own vehicle V travels, that is, needs to turn right, the near display region E2 displays the display information M3 related to the current behavior of the vehicle directed toward the pedestrian 100 around the crosswalk 200, such as "CAR STOPPED". Furthermore, the far display region E1 displays the display information M4 related to the future behavior of the vehicle directed toward pedestrians other than the pedestrian 100 around the crosswalk 200, such as "CAR GOING STRAIGHT". On the other hand, when there is the oncoming vehicle 600 that needs to turn right, the driver riding on the oncoming vehicle 600 might erroneously perceive that the display is made for the oncoming vehicle 600 although the display is actually made for the pedestrian 100 present around the crosswalk 200 and might then have to wait until the own vehicle V passes through. To handle this, the oncoming vehicle display region E3 displays display information M5 including a message such as "CAR IS STOPPED, TURNING RIGHT POSSIBLE", which is different from the display related to the behavior of the vehicle visually recognizable by the pedestrian 100 around the crosswalk 200. At this time, the first light emitting unit group 21a emits light based on the display information M4 indicating "CAR GOING STRAIGHT", the second light emitting unit group 21b emits light based on the display information M3 indicating "CAR STOPPED", and the third light emitting unit group 21c corresponding to the oncoming vehicle display region E3 emits light based on the display information M5 indicating "CAR IS STOPPED, TURNING RIGHT POSSIBLE". This makes it possible to perform display focused on the target of the message in accordance with the positional relationship between the own vehicle V and the oncoming vehicle, achieving transmission of useful information to the target.

Next, an outline of an operation of the vehicle exterior display device 1 will be described. FIG. 9 is a flowchart illustrating an example of control of the vehicle exterior display device according to the second embodiment. Since the basic operation of the vehicle exterior display device 1 according to the second embodiment is entirely or substantially the same as the vehicle exterior display device 1 according to the first embodiment, differences will be described below.

When having determined that the relative position between the own vehicle V and the pedestrian 100 is the far position (step S4: Yes), the display controller 35 displays display information M1 related to the future behavior of the own vehicle at the far position in the far display region E1, the display information M2 related to the current behavior of the own vehicle at the far position in the near display region E2, and display information M5 different from the display related to the behavior of the vehicle visible by the pedestrian 100 around the crosswalk 200 at the far position in the oncoming vehicle display region E3 (step S9). For example, the far display region E1 displays the display information M1 such as "CAR STOPPING" related to the future behavior of the own vehicle so that the pedestrian 100 at a far position with respect to the own vehicle V can determine whether the own vehicle V recognizes the pedestrian 100. The near display region E2 displays the display information M2, such as "CAR PASSING", directed for pedestrians other than the pedestrian 100 around the crosswalk 200 and for vehicles, which is different from the information displayed for the pedestrian 100 around the crosswalk 200. In addition, when there is the oncoming vehicle 600 that needs to turn right, the driver riding on the oncoming vehicle 600 might erroneously perceive that the display is made for the oncoming vehicle 600 although the display is actually made for the pedestrian 100 present around the crosswalk 200. To handle this, the oncoming vehicle display region E3 displays display information M5 such as "CAR PASSING", which is different from the display related to the behavior of the vehicle visually recognizable by the pedestrian 100 around the crosswalk 200. At this time, the first light emitting unit group 21a emits light based on the display information M1 indicating "CAR STOPPING", the second light emitting unit group 21b emits light based on the display information M2 indicating "CAR PASSING", and the third light emitting unit group 21c corresponding to the oncoming vehicle display region E3 emits light based on the display information M5 indicating "CAR PASSING" (refer to FIG. 8A).

Next, the display controller 35 calculates the positional relationship among the own vehicle V, the pedestrian 100, and the crosswalk 200 (step S2), determines that the own vehicle V is approaching the crosswalk 200 (step S3: Yes), and determines again whether the relative position between the own vehicle V and the pedestrian 100 is a far position (step S4). With this configuration, when the pedestrian 100 remains at the far position with respect to the own vehicle V, the display controller 35 maintains the display state of the display information M1 related to the future behavior of the own vehicle at the far position in the far display region E1, maintains the display state of the display information M2 related to the current behavior of the own vehicle at the far position in the near display region E2, and maintains the display state of the display information M5, which is different from the display related to the behavior of the vehicle visible by the pedestrian 100 around the crosswalk 200 at the far position, in the oncoming vehicle display region E3.

When having determined that the relative position between the own vehicle V and the pedestrian 100 is not the far position, that is, the relative position is the near position (step S4: No), the display controller 35 controls to display the display information M3 related to the current behavior of the own vehicle at the near position in the near display region E2, the display information M4 related to the future behavior of the own vehicle at the near position in the far display region E1, and the display information M5 different from the display related to the behavior of the vehicle visually recognizable by the pedestrian 100 around the crosswalk 200 at the near position, in the oncoming vehicle display region E3 (step S10). The near display region E2 displays the display information M3 such as "CAR STOPPED" related to the current behavior of the own vehicle so that the own vehicle V can determine whether the pedestrian 100 existing at the near position with respect to the own vehicle V can cross the crosswalk 200. Since the pedestrian 500, who is away from the vehicle V is concerned about the behavior taken by the automated driving vehicle, the display information M4 related to the future behavior of the vehicle such as "CAR STARTING" is displayed in the far display region E1 visually recognizable by the pedestrian 500 present farther away from the vehicle V. Moreover, the oncoming vehicle display region E3 displays the display information M5 such as "PEDESTRIAN IS CROSSING", which is different from the display related to the behavior of the vehicle visually recognizable by the pedestrian 100 existing around the crosswalk 200. At this time, the first light emitting unit group 21a emits light based on the display information M4 indicating "CAR STARTING", the second light emitting unit group 21b emits light based on the display information M3 indicating "CAR STOPPED", and the third light emitting unit group 21c corresponding to the oncoming vehicle display region E3 emits light based on the display information M5 indicating "PEDESTRIAN IS CROSSING". (refer to FIG. 8B).

Next, the display controller 35 determines whether the pedestrian 100 is present around the crosswalk 200 based on the crosswalk position information X2 and the pedestrian position information X3 (step S11). Here, the display controller 35 determines whether the pedestrian 100 has crossed the crosswalk 200.

Next, when having determined that the pedestrian 100 is present around the crosswalk 200 (step S11: Yes), the display controller 35 calculates a positional relationship among the own vehicle V, the pedestrian 100, and the crosswalk 200 (step S2), determines that the own vehicle V is approaching crosswalk 200 (step S3: Yes), and determines that the relative position between the own vehicle V and the pedestrian 100 is the near position (step S4: No). With this configuration, when the pedestrian 100 remains at the near position with respect to the own vehicle V, the display controller 35 maintains the display state of the display information M3 related to the current behavior of the vehicle at the near position in the near display region E2, maintains the display state of the display information M4 related to the future behavior of the own vehicle at the near position in the far display region E1, and maintains the display state of the display information M5, different from the display related to the behavior of the vehicle visually recognizable by the pedestrian 100 around the crosswalk 200 at the near position, in the oncoming vehicle display region E3.

Next, when having determined that there is no pedestrian 100 around the crosswalk 200 (step S11: No), the display controller 35 ends the display being performed by the display unit 20 (step S12).

The vehicle exterior display device 1 described above is capable of performing display focused on the target of the message in accordance with the positional relationship between the own vehicle V and the oncoming vehicle, achieving transmission of useful information to the target.

Note that the vehicle exterior display device 1 according to the first and second embodiments and the modifications described above is not limited to the above-described embodiments, and various modifications can be made within the scope described in the claims.

Although the vehicle V in the first and second embodiments and the modifications has been described as a vehicle capable of automated driving (semi-automated driving, fully automated driving), the type of vehicle V is not limited thereto. The vehicle V may be a manually drivable vehicle in which the behavior of the vehicle V can be controlled according to the driving operation by the driver of the vehicle V.

The display unit 20 according to each of the first and second embodiments and the modification has been described to display messages such as "CAR STOPPING" and "CAR STOPPED" as the display related to the behavior of the vehicle. However, the details of the display are not limited to this, and the messages may be displayed as graphics, symbols, histograms, or pictures other than the messages.

The vehicle exterior display device according to the present embodiments and the modification has an effect of performing display focused on a target of the message according to a positional relationship between an own vehicle and a pedestrian and successfully transmitting useful information to the target.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle exterior display device comprising:
    an own vehicle position information acquisition unit that acquires position information regarding an own vehicle;
    a crosswalk position information acquisition unit that acquires position information regarding a crosswalk;
    a surrounding information detection unit that detects a pedestrian around the own vehicle;
    a display unit that is provided on the own vehicle and that includes a plurality of display regions visually recognizable from outside of the own vehicle and is capable of displaying different types of display information visually recognizable by visually recognizing from the display region; and
    a display controller that changes display information displayed by the display unit and the display region in which the display information is displayed, based on a positional relationship, among the own vehicle, the crosswalk, and the pedestrian, determined by the display controller based on a predicted deceleration profile of the vehicle and a braking relationship between a distance and a speed at which the vehicle is predicted to be able to stop by sudden braking, wherein
    each of the plurality of display regions includes at least a far display region and a near display region,
    the display controller controls, out of the far display region and the near display region, the display region visible to the pedestrian existing around the crosswalk, to display display information related to behavior of a vehicle,
    at least when, based on the predicted deceleration profile and the braking relationship, the positional relationship between the vehicle and the pedestrian existing around the crosswalk is determined to be a far position, the display controller controls to perform display such that the display information displayed in the far display region and display information displayed in the near display region become different from each other, and
    the display controller is further configured to control both of the far display region and the near display region to be displayed simultaneously outside of the crosswalk.

2. The vehicle exterior display device according to claim 1, wherein
    when the display controller has determined that the positional relationship between the own vehicle and the pedestrian around the crosswalk is the far position, the display controller:
controls to change the display region visually recognizable by the pedestrian around the crosswalk to the far display region;
controls the far display region to display display information regarding future behavior of the vehicle;
controls the near display region to display display information related to current behavior of the vehicle, and
when the display controller has determined, based on the predicted deceleration profile and the braking relationship, that the positional relationship between the vehicle and the pedestrian around the crosswalk is a near position,
the display controller:
controls to change the display region visually recognizable by the pedestrian around the crosswalk to the near display region;
controls the far display region to display display information regarding future behavior of the vehicle; and
controls the near display region to display display information related to current behavior of the vehicle.

3. The vehicle exterior display device according to claim 1, wherein
the display unit includes lenses and a plurality of light emitting unit groups each corresponding to each lens,
the plurality of light emitting unit groups includes at least a first light emitting unit group corresponding to the far display region and a second light emitting unit group corresponding to the near display region, in which the first light emitting unit group and the second light emitting unit group are alternately arranged, and
the display controller controls the first light emitting unit group and the second light emitting unit group to emit light based on different types of display information.

4. The vehicle exterior display device according to claim 2, wherein
the display unit includes lenses and a plurality of light emitting unit groups each corresponding to each lens,
the plurality of light emitting unit groups includes at least a first light emitting unit group corresponding to the far display region and a second light emitting unit group corresponding to the near display region, in which the first light emitting unit group and the second light emitting unit group are alternately arranged, and
the display controller controls the first light emitting unit group and the second light emitting unit group to emit light based on different types of display information.

5. The vehicle exterior display device according to claim 1, wherein
the display unit further includes an oncoming vehicle display region,
the far display region is disposed between the near display region and the oncoming vehicle display region, and
the display controller controls the oncoming vehicle display region to display display information different from the display information related to the behavior of the vehicle visually recognizable by the pedestrian existing around the crosswalk.

6. The vehicle exterior display device according to claim 2, wherein
the display unit further includes an oncoming vehicle display region,
the far display region is disposed between the near display region and the oncoming vehicle display region, and
the display controller controls the oncoming vehicle display region to display display information different from the display information related to the behavior of the vehicle visually recognizable by the pedestrian existing around the crosswalk.

7. The vehicle exterior display device according to claim 1, wherein
the display controller is further configured to control both of the far display region and the near display region to be displayed simultaneously outside of the crosswalk and such that, in a direction from the own vehicle to the crosswalk, the far display region is further away from the crosswalk than is the near display region.

8. The vehicle exterior display device according to claim 1, wherein
when the positional relationship between the vehicle and the pedestrian existing around the crosswalk is the far position, the display controller controls to perform display such that the display information displayed in the far display region and display information displayed in the near display region become different from each other such that the far display region displays that the own vehicle is stopped or stops while the near display region displays that the own vehicle is starting or passing, and
when the positional relationship between the vehicle and the pedestrian existing around the crosswalk is the near position, the display controller controls to perform display such that the display information displayed in the far display region and display information displayed in the near display region become different from each other such that the near display region displays that the own vehicle is stopped or stops while the far display region displays that the own vehicle is starting or passing.

9. A vehicle exterior display device comprising:
an own vehicle position information acquisition unit that acquires position information regarding an own vehicle;
a crosswalk position information acquisition unit that acquires position information regarding a crosswalk;
a surrounding information detection unit that detects a pedestrian around the own vehicle;
a display unit that includes a plurality of display regions visually recognizable from outside of the own vehicle and is capable of displaying different types of display information visually recognizable by the display region; and
a display controller that changes display information displayed by the display unit and the display region in which the display information is displayed, based on a positional relationship, among the own vehicle, the crosswalk, and the pedestrian, determined by the display controller based on a predicted deceleration profile of the vehicle and a braking relationship between a distance and a speed at which the vehicle is predicted to be able to stop by sudden braking, wherein
each of the plurality of display regions includes at least a far display region and a near display region,
the display controller controls, out of the far display region and the near display region, the display region visible to the pedestrian existing around the crosswalk, to display display information related to behavior of a vehicle,
at least when a positional relationship between the vehicle and the pedestrian existing around the crosswalk is a far position, the display controller controls to perform display such that the display information displayed in the far display region and display information displayed in the near display region become different from each other, when the display controller has determined, based on the predicted deceleration profile and the braking relationship, that the positional relationship between the own vehicle and the pedestrian around the crosswalk is a far position, the display controller:

controls to change the display region visually recognizable by the pedestrian around the crosswalk to the far display region;

controls the far display region to display display information regarding future behavior of the vehicle;

controls the near display region to display display information related to current behavior of the vehicle, and when the display controller has determined, based on the predicted deceleration profile and the braking relationship, that the positional relationship between the vehicle and the pedestrian around the crosswalk is a near position, the display controller:

controls to change the display region visually recognizable by the pedestrian around the crosswalk to the near display region;

controls the far display region to display display information regarding future behavior of the vehicle; and controls the near display region to display display information related to current behavior of the vehicle.

10. The vehicle exterior display device according to claim 1, wherein the display controller is further configured to, while controlling both of the far display region and the near display region to be displayed simultaneously outside of the crosswalk, simultaneously control a first one of the far display region and the near display region to indicate that the own vehicle is stopped while controlling a second one of the far display region and the near display region to indicate that the own vehicle is any of starting and passing, and wherein both of the far display region and the near display region are both outside of the vehicle and outside of the crosswalk.

11. The vehicle exterior display device according to claim 9, wherein the display controller is further configured to, while controlling both of the far display region and the near display region to be displayed outside of the crosswalk, simultaneously control a first one of the far display region and the near display region to indicate that the own vehicle is stopped while controlling a second one of the far display region and the near display region to indicate that the own vehicle is any of starting and passing, and wherein both of the far display region and the near display region are both outside of the vehicle and outside of the crosswalk.

* * * * *